(12) United States Patent
Fujieda et al.

(10) Patent No.: US 8,361,359 B2
(45) Date of Patent: Jan. 29, 2013

(54) TIRE VULCANIZER

(75) Inventors: Yasuhiko Fujieda, Takasago (JP);
Masaharu Shibata, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 56 days.

(21) Appl. No.: 13/039,582

(22) Filed: Mar. 3, 2011

(65) Prior Publication Data
US 2011/0236514 A1    Sep. 29, 2011

(30) Foreign Application Priority Data

Mar. 23, 2010  (JP) ................................. 2010-066385

(51) Int. Cl.
*B29C 33/22* (2006.01)
(52) U.S. Cl. ........ 264/40.1; 264/40.5; 264/326; 425/29; 425/35; 425/137; 425/150; 425/153; 425/214
(58) Field of Classification Search .............. 425/28.1, 425/29, 35, 47, 136, 137, 150, 153, 154, 425/214; 264/40.1, 40.5, 326
See application file for complete search history.

(56) References Cited

U.S. PATENT DOCUMENTS

| | | | |
|---|---|---|---|
| 2,240,010 A * | 4/1941 | Bosomworth | 425/47 |
| 2,260,966 A * | 10/1941 | Brundage | 425/29 |
| 2,946,088 A * | 7/1960 | Soderquist | 425/29 |
| 3,023,457 A * | 3/1962 | Sunday | 425/47 |
| 3,924,479 A | 12/1975 | Lanzenberger | |
| 4,149,430 A | 4/1979 | F'Geppert | |
| 4,368,015 A | 1/1983 | Kawahara et al. | |
| 4,533,304 A | 8/1985 | Amano et al. | |
| 6,206,676 B1 * | 3/2001 | McNally | 425/214 |
| 2009/0139659 A1 | 6/2009 | Fujieda et al. | |

FOREIGN PATENT DOCUMENTS

| | | |
|---|---|---|
| JP | 1-24048 | 5/1989 |
| JP | 5-228938 | 9/1993 |

OTHER PUBLICATIONS

Extended European Search Report issued on Jul. 12, 2011 in the corresponding European Application No. 11157482.8.

* cited by examiner

*Primary Examiner* — James Mackey
(74) *Attorney, Agent, or Firm* — Oblon, Spivak, McClelland, Maier & Neustadt, L.L.P.

(57) ABSTRACT

In a tire vulcanizer configured to perform opening and closing of a mold using an efficient ball screw shaft or the like, a top mold mounting member holding a top mold is lifted and lowered by rotating the ball screw shaft with a driving mechanism to vertically lift and lower a ball nut, and the lifting and lowering of the top mold mounting member is stopped by fixing the ball screw shaft by the de-excitation of an electromagnetic brake connected directly to the ball screw shaft, independently from the driving mechanism. According to such a structure, the opening and closing of the mold can be stopped, even if abnormality of the driving mechanism or the brake occurs.

11 Claims, 9 Drawing Sheets

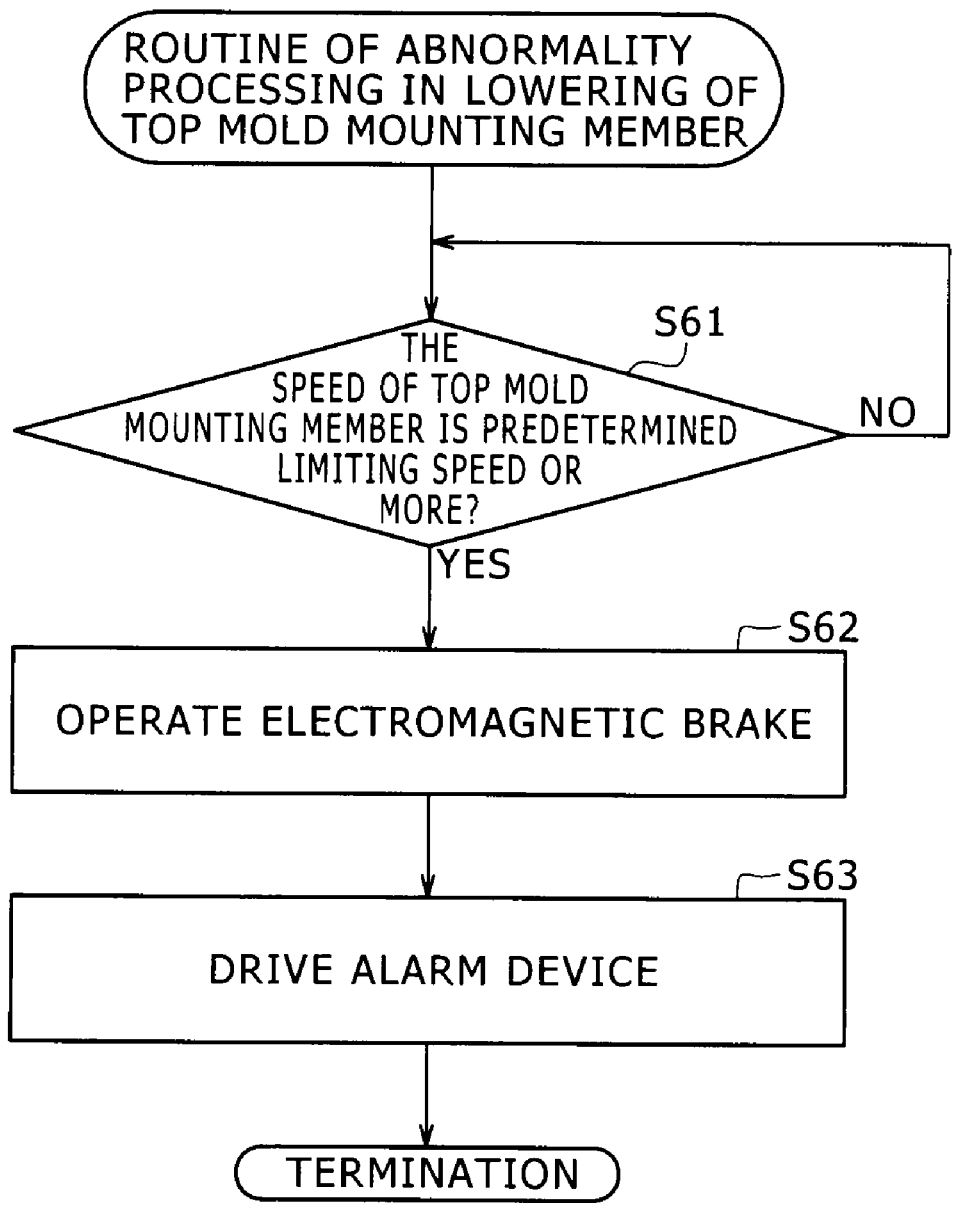

TIRE VULCANIZER

BACKGROUND OF THE INVENTION

1. Field of the Invention

The present invention relates to a tire vulcanizer for vulcanizing and patterning a tire within an openable and closable mold. More specifically, the present invention relates to a tire vulcanizer provided with a motor and a mechanical brake for controlling the lifting and lowering of a top mold mounting member that holds a top mold, and a brake control method therefor.

2. Description of the Related Art

A tire vulcanizer is a machine configured to vulcanize and pattern an unvulcanized green tire placed in a mold by heating from inside and outside the mold. Generally, the mold of the tire vulcanizer includes a two-piece mold divided into a top mold and a bottom mold. The top mold and bottom mold of the two-piece mold are held, respectively, on a top mold mounting member and a bottom mold mounting member, and opening and closing of the mold can be performed by lifting and lowering the top mold mounting member in a vertical direction relative to the bottom mold mounting member.

For example, a tire vulcanizer disclosed in Japanese Examined Patent Application Publication No. H1-24048 has a mechanical elevating means such as a screw shaft and a screw nut screwed to the screw shaft in such a manner as capable of being lifted and lowered, wherein the opening and closing of the mold can be performed by rotating the screw shaft with an electric motor to vertically lift and lower a top mold that moves up and down integrally with the mechanical elevating means relative to a bottom mold.

A tire vulcanizer disclosed in Japanese Patent Application Laid-Open No. 5-228938 includes an elevating shaft erected on the upper side of the center of an elevating stand through a fixture, and a female screw cylinder formed of a screw nut, a ball screw nut or the like, which is engaged with and inserted through the elevating shaft, wherein the opening and closing of the mold can be performed by rotating the female screw cylinder with a driving body to lift and lower the elevating shaft, thereby vertically lifting and lowering a movable top mold attached to the lower surface of the elevating stand relative to a fixed bottom mold.

In the process of vulcanizing green tire, the lifting and lowering of the top mold may be stopped in mid-course in case of, for example, loading or unloading a tire, emergency stop or the like. As the screw shaft or elevating shaft used as the elevating means, an efficient ball screw or the like is generally used in order to minimize the output of the motor or the like for rotating it. If such an efficient screw is used, particularly during lowering of the top mold, the top mold may not stop by powering off the motor due to the inertia of the motor and that of a rising and lowering part such as the top mold. Further, reverse fall of the top mold may occur during lifting of the top mold. Therefore, a mechanical brake such as an electromagnetic brake is attached to the conventional motor to stop the lifting and lowering of the top mold with the mechanical brake. Here, if abnormality such as breakage of the electromagnetic brake occurs during stoppage of the top mold, the brake on the top mold goes out, causing a problem such as collision with the bottom mold due to fall. Further, abnormality such as breakage of a driving mechanism (the motor or a power transmission unit for transmitting drive power of the motor) during the lifting and lowering of the top mold causes a problem such as fall of the top mold or breakage of a guide part for guiding the lifting and lowering of the top mold due to imbalanced load. However, the tire vulcanizes disclosed in the literatures described above have no countermeasures to abnormalities as described above.

SUMMARY OF THE INVENTION

The present invention has been achieved to solve the above-mentioned problems. An object of the present invention is to provide a tire vulcanizer configured to perform opening and closing of a mold with an elevating means using an efficient ball screw shaft or the like, which can stop the opening and closing of the mold, even if abnormality of a driving mechanism or brake occurs.

In order to attain the above object, a tire vulcanizer according to the present invention includes: a top mold and a bottom mold for placing a green tire; a top mold mounting member connected to the top mold; a guide mechanism for vertically guiding the top mold mounting member; a ball screw shaft having a vertically aligned shaft center; a ball nut screwed to the ball screw shaft and connected to the top mold mounting member; a driving mechanism for rotating the ball screw shaft switchably between normal direction and reverse direction; and an excitation-free electromagnetic brake connected directly to the ball screw shaft to fix the ball screw shaft.

According to the above structure, when the driving mechanism rotates the ball screw shaft, the ball nut is not rotated in a horizontal direction relative to the ball screw shaft due to the top mold mounting member vertically guided with the guide mechanism. The ball nut is consequently lifted or lowered in accordance with normal-directional or reverse-directional rotation of the ball screw shaft. Therefore, the top mold mounting member connected to the ball nut is lifted or lowered together. In order to stop the lifting and lowering of the top mold mounting member, the electromagnetic brake connected directly to the ball screw shaft is operated, in addition to stoppage of rotation of the ball screw shaft with the driving mechanism, to fix the ball screw shaft. Since the driving mechanism and the electromagnetic brake are independent from each other, differed from a conventional structure, for example, such that the electromagnetic brake is attached to the driving mechanism, the top mold mounting member can be braked with the electromagnetic brake, even if abnormality occurs in the driving mechanism. Further, since the excitation-free electromagnetic brake is used, the top mold mounting member can be braked with the electromagnetic brake, even if energization is disabled due to power outage.

In the tire vulcanizer according to the present invention, the driving mechanism may be provided with an inverter motor, and the tire vulcanizer may further comprise an inverter capable of servo-locking the inverter motor; a measuring device for measuring an elevating position of the top mold mounting member; and a control device for controlling the inverter, based on the elevating position measured by the measuring device, to servo-lock the inverter motor.

According to the above-mentioned structure, the lifting/lowering and stoppage of the top mold mounting member can be accurately performed using the servo-locking function of the inverter.

In the tire vulcanizer according to the present invention, the control device may further execute a brake operation switching control for switching between operation and release of the electromagnetic brake, and a motor power control for powering on and off the inverter motor by controlling the inverter, thereby operating the electromagnetic brake to fix the ball screw shaft under the condition that the inverter motor allows the top mold mounting member to perform retained operation to stop in the elevating direction, and thereafter powering off the inverter motor by controlling the inverter.

According to the above-mentioned structure, brake is applied with the electromagnetic brake under the condition that the inverter motor allows the top mold mounting member to perform retained operation. Namely, a stopped ball screw shaft is braked with the electromagnetic brake. Compared with a case in which the electromagnetic brake is operated simultaneously with power-off of the motor, that is, the inertially-rotated ball screw shaft is suddenly braked with the electromagnetic brake, the stopping accuracy of the top mold mounting member can be consequently enhanced, and the life of a friction plate used in the electromagnetic brake or the like can be extended.

In the tire vulcanizer according to the present invention, the control device may further execute a brake operation switching control for switching between operation and release of the electromagnetic brake, and calculate an elevating speed of the top mold mounting member based on the elevating position measured by the measuring device, and if the control device judges that the elevating speed is higher than a predetermined limiting speed, the control device may operate the electromagnetic brake to fix the ball screw shaft.

According to the above-mentioned structure, even if the elevating speed of the lifting or lowering top mold mounting member exceeds the limiting speed due to abnormality of the inverter motor, the top mold mounting member is brought to an emergency stop with the electromagnetic brake. The electromagnetic brake can be thus used as an emergency brake.

In the tire vulcanizer according to the present invention, the measuring device may measure the elevating position of the top mold mounting member not through the driving mechanism.

According to the above-mentioned structure, even if the elevating speed of the lifting or lowering top mold mounting member exceeds the limiting speed due to abnormality of the mechanism ranging from the inverter motor to the ball screw shaft constituting the driving mechanism, the top mold mounting member is brought to an emergency stop with the electromagnetic brake.

In the tire vulcanizer according to the present invention, when the ball screw shaft is fixed with the electromagnetic brake, and if the control device judges that the top mold mounting member has lowered based on the elevating position measured by the measuring device, the control device may control the inverter to servo-lock the inverter motor.

According to the above-mentioned structure, even if a stopped top mold mounting member has unexpectedly lowered due to abnormality of the electromagnetic brake, the top mold mounting member can be brought to an emergency stop with the inverter motor. Thus, the inverter motor can be used as an emergency brake.

The tire vulcanizer according to the present invention may further include an obstacle detection device for detecting whether obstacle is within the mold, wherein when the ball screw shaft is fixed with the electromagnetic brake, and if the control device judges that the top mold mounting member has lowered based on the elevating position measured by the measuring device, the control device may control the inverter to servo-lock the inverter motor, and thereafter if the control device judges absence of obstacle with the obstacle detection device, the control device may put the mold into mold closing position by controlling the inverter.

According to the above-mentioned structure, even if a stopped top mold mounting member has unexpectedly lowered due to abnormality of the electromagnetic brake, the top mold mounting member is brought to an emergency stop with the inverter motor. Thus, the inverter motor can be used as an emergency brake. If absence of obstacle is then judged, the mold is automatically put into mold closing position. The mold can be consequently safely closed without a trouble such as fall of the top mold mounting member under the presence of an obstacle.

According to the present invention, a brake control method for the tire vulcanizer configured to open and close a mold formed of a top mold and a bottom mold by vertically lifting and lowering a ball nut using rotation of a ball screw shaft with an inverter motor, the ball nut screwed to the ball screw shaft, to thereby lift and lower a top mold mounting member connected to the top mold, includes: operating an electromagnetic brake, under the condition that the inverter motor allows the top mold mounting member to perform retained operation to stop in the elevating direction, to fix the ball screw shaft, and thereafter powering off the inverter motor.

According to the above-mentioned control method, brake is applied with the electromagnetic brake under the condition that the inverter motor allows the top mold mounting member to perform retained operation. Namely, a stopped ball screw shaft is braked with the electromagnetic brake. Therefore, compared with a case in which the electromagnetic brake is operated simultaneously with power-off of the motor, that is, the inertially-rotated ball screw shaft is suddenly braked with the electromagnetic brake, the stopping accuracy of the top mold mounting member can be enhanced, and the life of a friction plate used in the electromagnetic brake or the like can be extended.

In the brake control method for the tire vulcanizer according to the present invention, if an elevating speed of the top mold mounting member is judged to be higher than a predetermined limiting speed, the electromagnetic brake may be operated to fix the ball screw shaft.

According to the above-mentioned control method, even if the elevating speed of the top mold mounting member being lifted or lowered exceeds the limiting speed due to abnormality of the inverter motor, the top mold mounting member is brought to an emergency stop with the electromagnetic brake. Thus, the electromagnetic brake can be used as an emergency brake.

In the brake control method for the tire vulcanizer according to the present invention, when the ball screw shaft is fixed with the electromagnetic brake, and if the top mold mounting member is judged to have lowered, the inverter motor may be servo-locked.

According to the above-mentioned control method, the top mold mounting member is brought to an emergency stop with the inverter motor, even if a stopped top mold mounting member has unexpectedly lowered due to abnormality of the electromagnetic brake. Thus, the inverter motor can be used as an emergency brake.

Further, in the brake control method for the tire vulcanizer according to the present invention, when the ball screw shaft is fixed by operating the electromagnetic brake, and if the top mold mounting member is judged to have lowered, the inverter motor may be servo-locked, and thereafter if absence of obstacle within the mold is judged, the mold may be put into mold closing position.

According to the above-mentioned control method, even if a stopped top mold mounting member has unexpectedly lowered due to abnormality of the electromagnetic brake, the top mold mounting member is brought to an emergency stop with the inverter motor. Thus, the inverter motor can be used as an emergency brake. If absence of obstacle is then confirmed, the mold is automatically put into mold closing position by driving the inverter motor. The mold can be consequently safely closed without a trouble such as fall of the top mold mounting member under the presence of an obstacle.

According to the present invention, even if abnormality occurs in the driving mechanism, or energization is disabled due to power outage, the top mold mounting member can be braked with the electromagnetic brake.

BRIEF DESCRIPTION OF THE DRAWINGS

FIG. 9 is a flowchart showing a routine of abnormality processing in lowering of top mold mounting member, which is executed by the tire vulcanizer according to the one embodiment of the present invention.

DESCRIPTION OF THE PREFERRED EMBODIMENTS

An embodiment of a tire vulcanizer according to the present invention will be described in reference to the drawings.

[Overall Structure of Tire Vulcanizer]

Figure 1:
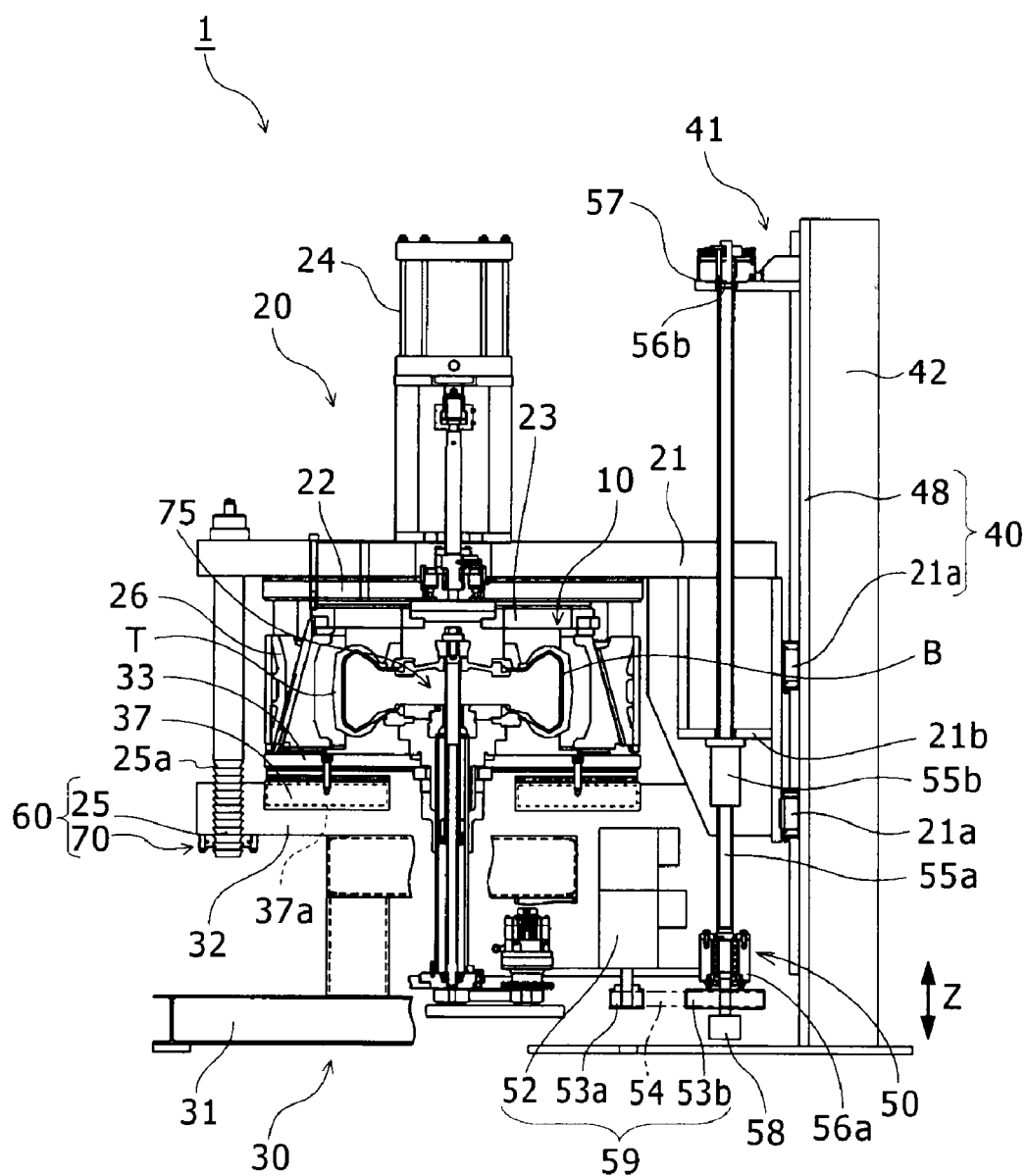
FIG. 1 is a transverse sectional view of a tire vulcanizer according to one embodiment of the present invention, which shows a state where a top mold and a bottom mold are closed.
Figure 2:
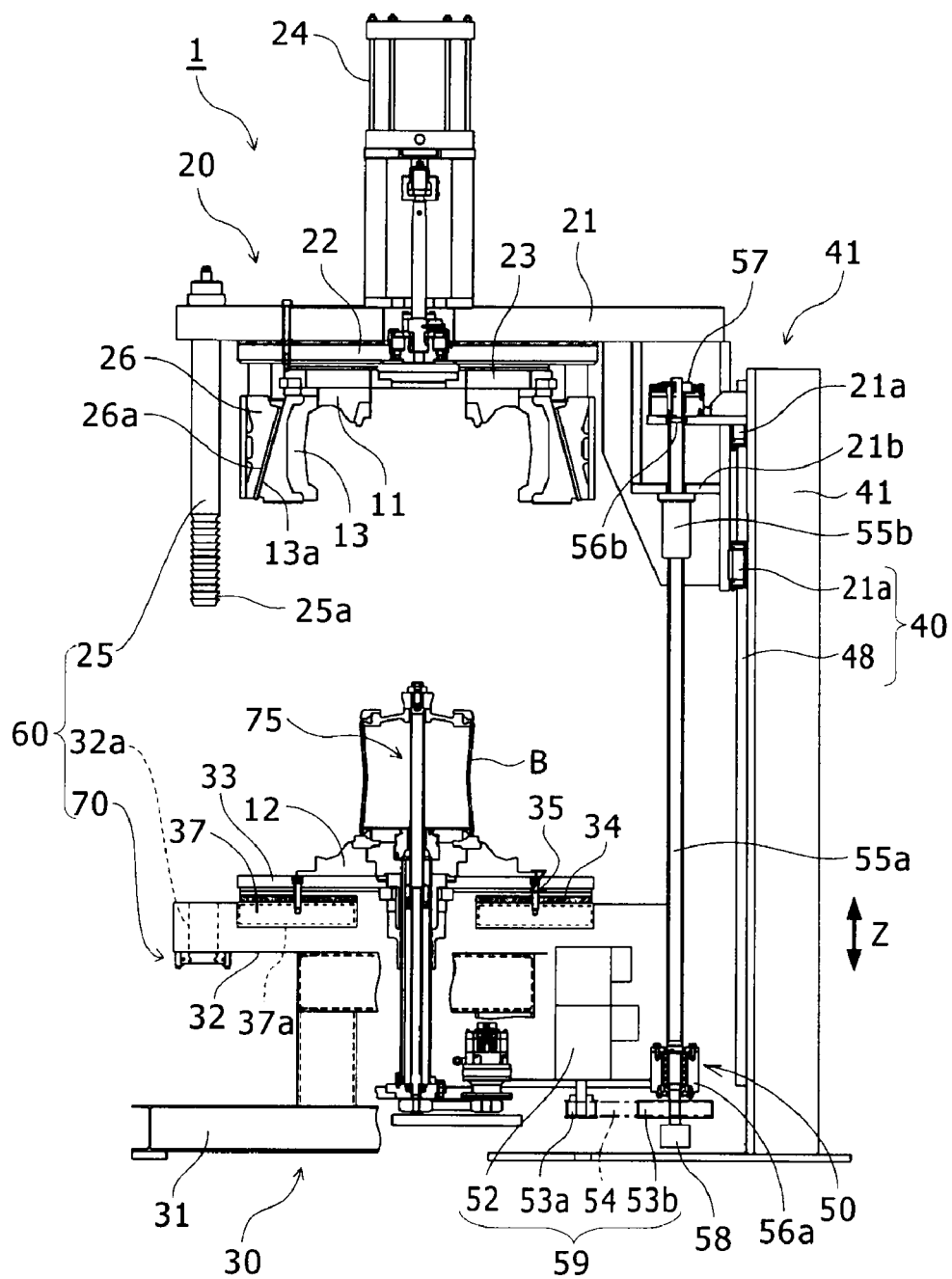
FIG. 2 is a transverse sectional view of the tire vulcanizer according to the one embodiment of the present invention, which shows a state where the top mold and the bottom mold are opened.

A tire vulcanizer 1 according to this embodiment is a type of pressing device configured to vulcanize a green tire T by internally heating the tire with a heating and pressurizing medium charged thereinto, and externally heating a mold 10. As shown in FIGS. 1 and 2, the tire vulcanizer 1 includes: a top mold 11 and a bottom mold 12 constituting the mold 10 for placing the green tire T; a top mold mounting member 20 connected to the top mold 11; a guide mechanism 40 for vertically guiding the top mold mounting member 20; a ball screw shaft 55a having a vertically aligned shaft center; a ball nut 55b screwed to the ball screw shaft 55a and connected to the top mold mounting member 20; a driving mechanism 59 for rotating the ball screw shaft 55a switchably between normal direction and reverse direction; and an excitation-free electromagnetic brake 57 connected directly to the ball screw shaft 55a to fix the ball screw shaft 55a.

In the tire vulcanizer 1 according to this embodiment, the driving mechanism 59 is provided with an inverter motor 52, and the tire vulcanizer 1 further comprises an inverter 52a capable of servo-locking the inverter motor 52; an encoder 58 for measuring an elevating position of the top mold mounting member 20; and a control device 80 for controlling the inverter 52a, based on the elevating position measured by the encoder 58, to servo-lock the inverter motor 52.

[Green Tire]

The green tire T is horizontally placed in the mold 10, and vulcanized and patterned by being heated from inside and outside the green tire T. As the heating and pressurizing medium for vulcanizing and patterning the green tire T, steam, gas (inert gas such as nitrogen gas or air as the type of gas), or the like can be given.

[Mold]

The mold 10 used in the tire vulcanizer 1 of this embodiment is a segment divided into the top mold 11, the bottom mold 12 and a side mold 13. The top mold 11 is disposed on the upper side of the horizontally-placed green tire T, the bottom mold 12 is disposed on the lower side of the green tire T, and the side mold 13 is disposed on the outer circumferential side of the green tire T. The side mold 13 is divided in the circumferential direction, and engaged with the outer circumferential portions of the top mold 11 and the bottom mold 12 when the mold is closed.

An inclined surface 13a is formed on the outer circumference of the circumferentially divided side mold 13 so as to be inclined radially inwardly toward the top. An inclined surface 26a having the same gradient as the inclined surface 13a is formed on the inner surface of a container ring 26 disposed radially outside the side mold 13. The side mold 13 is configured to be circumferentially opened or closed through the inclined surface 13a that is moved along the inclined surface 26a by raising or lowering the side mold 13.

[Top Mold Mounting Member]

The top mold mounting member 20 holds the above-mentioned top mold 11 and side mold 13 by being connected to these molds, and is made to be lifted and lowered in a vertical direction (Z direction) with an opening and closing mechanism 50. The top mold mounting member 20 includes: an upper slide 21 that is a base of the top mold mounting member 20; an upper platen 22 fixed to the lower surface of the upper slide 21; an upper adaptor 23 for holding the top mold 11; a cylinder 24 for moving the upper adaptor 23 in the vertical direction (Z direction); a plurality of tie rods 25 (three in this embodiment) that is a partial element of a locking mechanism 60, the upper end portions of the tie rods being fixed to the upper slide 21; and a container ring 26 attached to the upper platen 22.

Guide members 21a that are linear bearings to be guided in the vertical direction with a guide rail 48 of an upright 41 which will be described later are provided on a side surface of the upper slide 21. The guide rail 48 and the guide members 21a constitute a guide mechanism 40 for guiding the top mold mounting member 20 in the vertical direction.

The upper slide 21 includes a mounting seat 21b provided adjacently to the side surface provided with the guide members 21a. A ball nut 55b of the opening and closing mechanism 50 is fixed to the lower surface of the mounting seat 21b. A through-hole for allowing the ball screw shaft 55a of the opening and closing mechanism 50 to be passed therethrough is provided in the mounting seat 21b.

[Bottom Mold Mounting Member]

The bottom mold mounting member 30 holds the bottom mold 12 by being connected thereto, and has a center mechanism 75 at the center thereof. The bottom mold mounting member 30 includes: a press base 31 that is a base of the bottom mold mounting member 30; a lower support 32 provided with a gas cylinder 37 that is a squeezing mechanism; and a lower platen 33 attached to a piston member 37a, which will be described later, of the gas cylinder 37 while holding the bottom mold 12. The lower platen 33 is fixed to the piston member 37a with bolts 35 through a heat insulation material 34.

The lower support 32 is fixed to the press base 31, and has through-holes 32a formed in positions corresponding to each of the above-mentioned three tie rods 25 (refer to FIG. 2). The lower platen 33 is movable up and down in the vertical direction relative to the lower support 32 with the piston member 37a. The press base 31 is provided with an upright 41.

[Upright]

The upright 41 is provided in order to guide the top mold mounting member 20 (upper slide 21) in the vertical direction (Z-direction). The upright 41 includes a base section 42 provided outside the top mold mounting member 20 (upper platen 22) and extending in the vertical direction; the opening and closing mechanism 50 for lifting and lowering the top mold mounting member 20 (upper slide 21); and the guide rail 48 that is a linear rail for guiding the guide members 21a in the vertical direction (Z-direction).

[Opening and Closing Mechanism]

The opening and closing mechanism 50 is formed of a ball screw mechanism having the ball screw shaft 55a driven with the driving mechanism 59, and lifts and lowers the top mold mounting member 20 in the vertical direction by converting rotational motion of the driving mechanism 59 to linear motion. The opening and closing mechanism 50 includes the ball screw shaft 55a connected to the driving mechanism 59; the ball nut 55b screwed to the ball screw shaft 55a; and a lower bearing 56a and an upper bearing 56b for rotatably supporting the ball screw shaft 55a. The ball nut 55b maintains such a state that it is not rotated in a horizontal direction relative to the ball screw shaft 55a, and moves up and down in the vertical direction according to normal-directional or reverse-directional rotation of the ball screw shaft 55a. The ball screw shaft 55a has a structure in which a ball rolls between it and the ball nut 55b, so that the screw can be efficiently rotated with minimized drive torque. The ball nut 55b is fixed to the mounting seat 21b of the upper slide 21. Namely, the ball nut 55b is retained by the top mold mounting member 20. Therefore, the top mold mounting member is also lifted and lowered together with upward and downward movement of the ball nut 55b.

[Driving Mechanism]

The driving mechanism 59 has a role of rotating the ball screw shaft 55a to lift and lower the ball nut 55b in the vertical direction. The driving mechanism 59 concretely includes the inverter motor 52 that is a drive source, a pulley 53a, a pulley 53b, and a timing belt 54. The pulley 53a has a hole formed at the center, and the hole is fitted to the rotating shaft of the inverter motor 52 provided in the vertical direction. When the inverter motor 52 is driven, the pulley 53a is also rotated in the same horizontal direction as the rotation of the rotating shaft of the inverter motor 52. The pulley 53b is disposed with a predetermined distance from the pulley 53a, and a hole formed at the center of the pulley 53b is fitted to the lower end portion of the ball screw shaft 55a provided in the vertical direction. The timing belt 54 is installed to link the pulley 53a and the pulley 53b, and has a role of transmitting a rotating force of the pulley 53a to the pulley 53a. In this embodiment, although the inverter motor 52 and the like are used as the driving mechanism 59, any mechanism which can rotate the ball screw shaft 55a may be used without limitation.

[Inverter Motor]

The inverter motor 52 is a motor which rotates switchably between normal direction and reverse direction at steplessly varied optional speed. The inverter motor 52 according to this embodiment is connected to the inverter 52a of vector control system, and has a servo-locking function using the inverter 52a. Further, the inverter 52a is controlled by the control device 80 of FIG. 4, so that the rotating angle, rotating speed or the like of the inverter motor 52 can be accurately controlled. Therefore, upward and downward movement or stoppage of the top mold mounting member 20 can be accurately performed. In this embodiment, although the inverter 52a and the inverter motor 52 are used, a servo motor can be used instead. Although a general motor is applicable in the present invention, the inverter motor is more preferably used from the viewpoint that it has sufficient cooling capability even at low speed and can be driven together with an only cooling fan.

[Measuring Device]

As the measuring device, the encoder 58 is used in this embodiment. The encoder 58 is connected directly to the opening and closing mechanism 50. Concretely, the encoder 58 is attached to the bottom end portion of the ball screw shaft 55a, and can indirectly measure an elevating position of the top mold mounting member 20 by detecting rotation of the ball screw shaft 55a. Position information detected with the encoder 58 is managed by the control device 80, and used to control the inverter 52a. Although a multi-rotation absolute encoder capable of detecting an absolute position is preferably used as the encoder 58, other encoders which can indirectly or directly measure the elevating position of the top mold mounting member 20 such as a linear encoder may be used. A measuring device other than the encoder can be used also to obtain the position information of the top mold mounting member 20. The measuring device such as the encoder may be connected to the opening and closing mechanism 50 through the driving mechanism 59. However, if position detection may conceivably be impossible due to cutting or the like of the timing belt 54 according to this embodiment, it is desired to connect the measuring device not through the driving mechanism 59.

According to such a structure, when the inverter motor 52 is driven, the pulley 53a connected to the rotating shaft of the inverter motor 52 is rotated in the horizontal direction to rotate the pulley 53b in the horizontal direction through the timing belt 54. The ball screw shaft 55a connected to the pulley 53b is, thereby, rotated to move the ball nut 55b along the axial direction (vertical direction, Z-direction) of the ball screw shaft 55a. When the ball nut 55b is moved in the vertical direction (Z-direction) in this way, the upper slide 12 having the mount seat 21b connected to the ball nut 55b is moved in the vertical direction (Z-direction) together with the ball nut 55b. At this time, the moving direction of the upper slide 21 is limited only to the vertical direction (Z-direction) with the guide mechanism 40 (the guide member 21a and the guide rail 48). Therefore, the top mold mounting member 20 connected to the ball nut 55b can be lifted and lowered in the vertical direction. Further, since the top mold mounting member 20 is lifted and lowered by converting rotational motion of the inverter motor 52 that is easy to control for rotating speed, rotating angle or the like to linear motion, the positioning accuracy of the top mold mounting member 20 can be enhanced, compared with a case in which the top mold mounting member 20 is lifted and lowered only with the linear motion of a cylinder or the like.

[Electromagnetic Brake]

The electromagnetic brake 57 has a mechanism mechanically tightening or releasing by use of an electromagnetic force generated in a coil from energization and a force of a spring, and the mechanism is connected directly to an upper end portion of the ball screw shaft 55a. Concretely, the electromagnetic brake 57 according to this embodiment is connected to the upper end portion of the ball screw shaft 55a in such a manner as to cover the outer circumferential side of the upper end portion. The electromagnetic brake 57 according to this embodiment is an excitation-free brake that operates, when energized, to release a brake pad that tightens a friction plate, and when not energized, to tighten the friction plate with the brake pad by using the force of the spring. Namely, the electromagnetic brake 57 is operated to fix the ball screw shaft 55a by de-energizing the electromagnetic brake 57. The lifting and lowering of the top mold mounting member 20 can be consequently stopped by operating the electromagnetic brake 57 to fix the ball screw shaft 55a. Since the electromagnetic brake 57 is connected directly to the ball screw shaft 55a and provided independently from the driving mechanism 59 for rotating the ball screw shaft 55a, the top mold mounting member 20 can be braked with the electromagnetic brake 57, even if abnormality occurs in the driving mechanism 59. Since the excitation-free electromagnetic brake is adopted, the top mold mounting member 20 can be braked with the electromagnetic brake 57, even if energization becomes impossible due to power outage. The electromagnetic brake 57 is controlled to be operated or released by the control device 80 which will be described below.

[Control Device]

Figure 4:
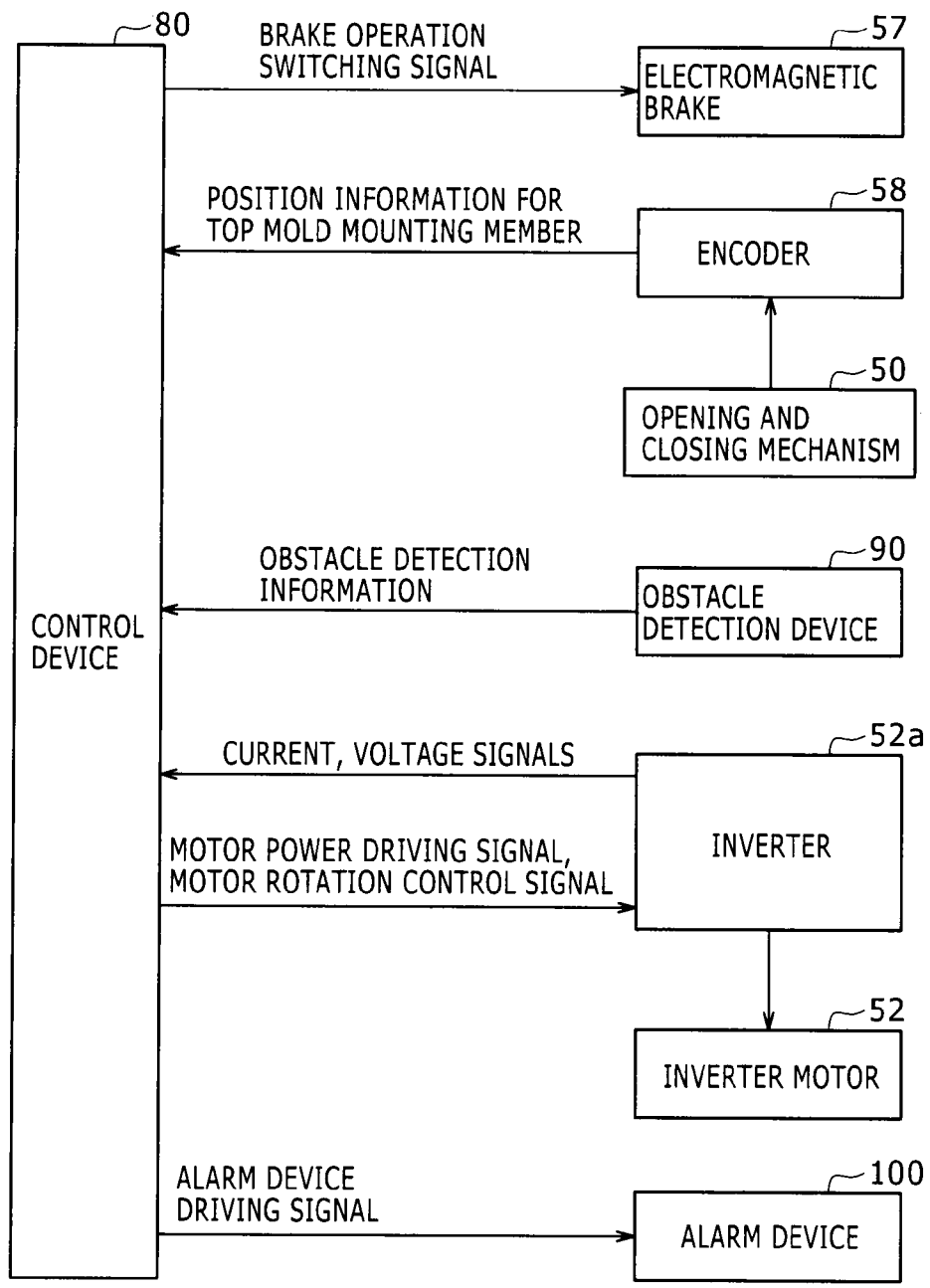
FIG. 4 is a block diagram showing the internal constitution of the tire vulcanizer according to the one embodiment of the present invention.

The control device 80 executes a brake operation switching control for switching between operation and release of the electromagnetic brake 57, a motor power control for powering on and off the inverter motor 52 by controlling the inverter 52a based on the elevating position of the top mold mounting member 20 measured by the encoder 58, and a motor rotation control for controlling the rotating speed of the inverter motor 52 by controlling the inverter 52a based on the elevating position. Concretely, the control device 80 according to this embodiment is connected, as shown in FIG. 4, to the electromagnetic brake 57, the encoder 58 which is connected directly to the opening and closing mechanism 50, an obstacle detection device 90, the inverter 52a connected to the inverter motor 52, and an alarm device 100. According to such a structure, the control device 80 acquires position information of the top mold mounting member related to the elevating position of the top mold mounting member 20 from the encoder 58, and calculates an elevating speed or elevating position of the top mold mounting member 20. Based on this result, the control device 80 can output a brake operation switching signal to the electromagnetic brake 57 to control the operation or release of the electromagnetic brake 57. The control device 80 also can output a motor power drive signal to the inverter 52a to power on and off the inverter motor 52. Further, the control device 80 can output a motor rotation control signal to the inverter 52a to control the rotating speed of the inverter motor 52. At that time, the control device 80 acquires current and voltage signals from the inverter 52a to calculate a torque to thereby use the torque to control the rotation of the inverter motor 52. Thus, the top mold mounting member 20 can be appropriately braked with the electromagnetic brake 57 or the inverter motor 52 according to the elevating condition of the top mold mounting member 20. The obstacle detection device 90 checks for an obstacle such as tire in the tire vulcanizer 1 by use of infrared ray or the like, and outputs obstacle detection information to the control device 80. As the obstacle detection means, other means without using infrared ray may be adopted. The alarm device 100 gives an alarm to an outside operator or the like by blaring of a siren or the like based on alarm device driving signal from the control device.

[Locking Mechanism]

The locking mechanism 60 is mainly formed of the tie rods 25, lock plate shifting mechanisms 70, and the through-holes 32a formed in the lower support 32. The locking mechanism 60 is provided to lock the top mold 11 and the bottom mold 12 while keeping them closed. More specifically, the locking mechanism 60 is provided to lock the mold 10 so as not to be opened during vulcanization by locking the top mold mounting member 20 to the bottom mold mounting member 30 through the tie rods 25.

A plurality of grooves 25a is formed at an equal vertical interval on the lower end portion of each tie rod 25. Namely, the vertical pitch of the grooves 25a is equalized. Instead of the equal interval, the grooves 25a may be formed at an interval corresponding to mold height, or a specific groove 25a of the plurality of grooves 25a may be formed at a position corresponding to specific mold height. Namely, the lower end portion of each tie rod 25 only needs to have the plurality of grooves 25a formed in the vertical direction. The lock plate shifting mechanisms 70 can lock the upper slide 21 (the top mold mounting member 20) at a predetermined position corresponding to the height of the mold 10 by engaging lock plates of each lock plate shifting mechanism 70 with a predetermined groove 25a of each tie rod 25 passed through each through-hole 32a. The upward surface of each groove 25a of each tie rod 25 and the downward surfaces of the lock plates are formed horizontally, so that these horizontal surfaces can receive a reaction force of a clamping force generated with the gas cylinder 37.

Figure 3:
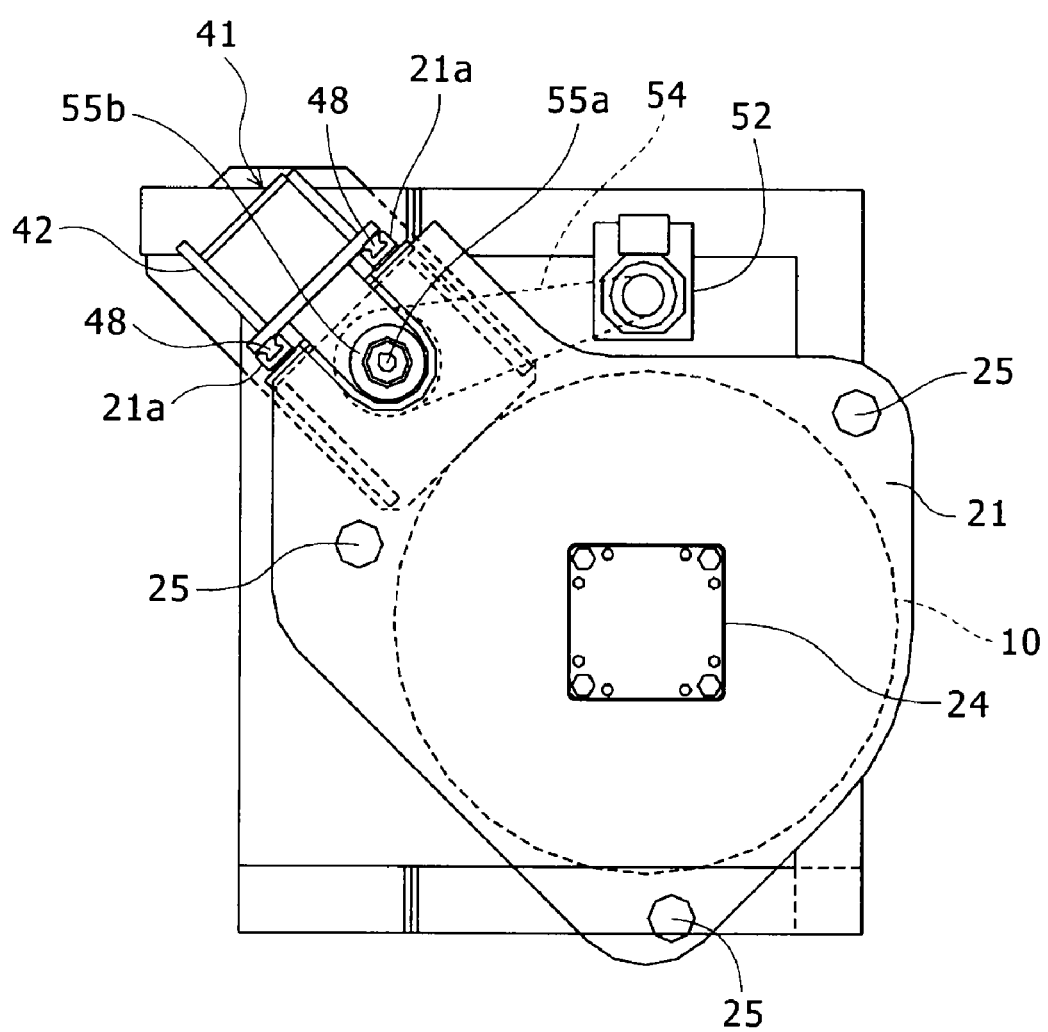
FIG. 3 is a plan view of the tire vulcanizer shown in FIG. 1.

The tire vulcanizer 1 is provided with the locking mechanism 60 formed of the multiple (three in this embodiment) tie rods 25. Since the reaction force of the clamping force generated with the gas cylinder 37 is shared and received by the multiple tie rods 25, the force received by each of the tie rods 25 can be reduced. The tie rods 25 are arranged, as shown in FIG. 3, at equal intervals along the circumference of the top mold 11 (the mold 10). In other words, the tie rods 25 are arranged so that the center-of-gravity position of a shape formed by connecting the tie rods 25 (a triangle when the number of tie rods is three) in planar view is matched to the center of the mold 10 (the circle center of the piston member 37a). In this way, the force received by each of the tie rods 25 is equalized. The number of the tie rods 25 is preferably three or more in order to stably lock the top mold mounting member 20 in a balanced manner relative to the bottom mold mounting member 30.

In the tire vulcanizer 1 of this embodiment, the locking mechanism 60 and the guide mechanism 40 are provided separately. Namely, the tie rods 25 do not have the function of guiding the top mold mounting member 20 in the vertical direction. Therefore, when the top mold mounting member 20 is lifted with the opening and closing mechanism 50 to separate the top mold 11 from the bottom mold 12, the tie rods 25 do not need to connect the top mold mounting member 20 to the bottom mold mounting member 30. Namely, since it is only necessary for the tie rods 25 to have a vertical length needed to mount the mold 10 of a possible maximum height in the tire vulcanizer 1. Therefore, in this embodiment, the vertical length of the tie rods 25 is set such that, under the condition that the top mold 11 and the bottom mold 12 is closed (refer to FIG. 1), that is, in a mold clamping condition where the top mold 11 reaches a predetermined lower end position, the lower end portion of each tie rod 25 is located below each through-hole 32a, and under the condition that the top mold 11 and the bottom mold 12 are separated (refer to FIG. 2), that is, in a mold opening state where the top mold 11 reaches a predetermined height position, the lower end portion of each tie rod 25 is located above each through-hole 32a. According to this, when the top mold 11 and the bottom mold 12 are separated, as shown in FIG. 2, to load the green tire T or unload the vulcanized tire, the lower end portions of the tie rods 25 can be released (separated) from the bottom mold mounting member 30. Since a laterally opened working space can be consequently secured between the upper and bottom molds 11 and 12, that is, between the lower end portions of the tie rods 25 and the bottom mold mounting member 30, it is possible to enhance the flexibility of installing position of a tire loading and unloading apparatus (loader or unloader) and improve the workability in replacement of the mold 10. That is to say, the tire loading and unloading apparatus can be readily transferred in and from between the top mold mounting member 20 and the bottom mold mounting member 30 without interference from the tie rods 25. Namely, the tie rods 25 do not hinder replacement of the mold 10.

[Squeezing Mechanism]

The squeezing mechanism is the gas cylinder 37 having the annular piston member 37a. When the locking mechanism 60 locks the top mold 11 and the bottom mold 12 in closed state, and if pressure fluid is supplied to the gas cylinder 37 to pressurize the piston member 37a upward (lifted from an initial position), the lower platen 33 is moved upward in accordance with the rise of the piston member 37a. Since the bottom mold 12 is pushed up in accordance with this movement of the lower platen 33, a clamping force against the tire internal pressure during vulcanization is generated between the top mold 11 and the bottom mold 12 through the tie rods 25.

When the locking mechanism 60 locks the top mold 11 and the bottom mold 12 in closed state, and if pressure fluid is not supplied to the gas cylinder 27, the lower platen 33 is moved downward due to the weight of heavy loads such as the top mold 11 and the bottom mold 12 in closed state, the top mold mounting member 20 and the tie rods 25. The piston member 37a is also moved downward (automatically returned to the initial position) in accordance with this downward movement of the lower platen 33. Therefore, since the gas cylinder 37 is needed to pressurize only upward, a single-acting cylinder can be used as the gas cylinder 37. Compared with a case using a double-acting cylinder as the gas cylinder 37, the operation system (piping, etc.) of the squeezing mechanism can be consequently simplified.

(Operation of Tire Vulcanizer)

The operation of the tire vulcanizer 1 will be then described.

(Total Routine of Tire Vulcanizer Processing)

Figure 5:
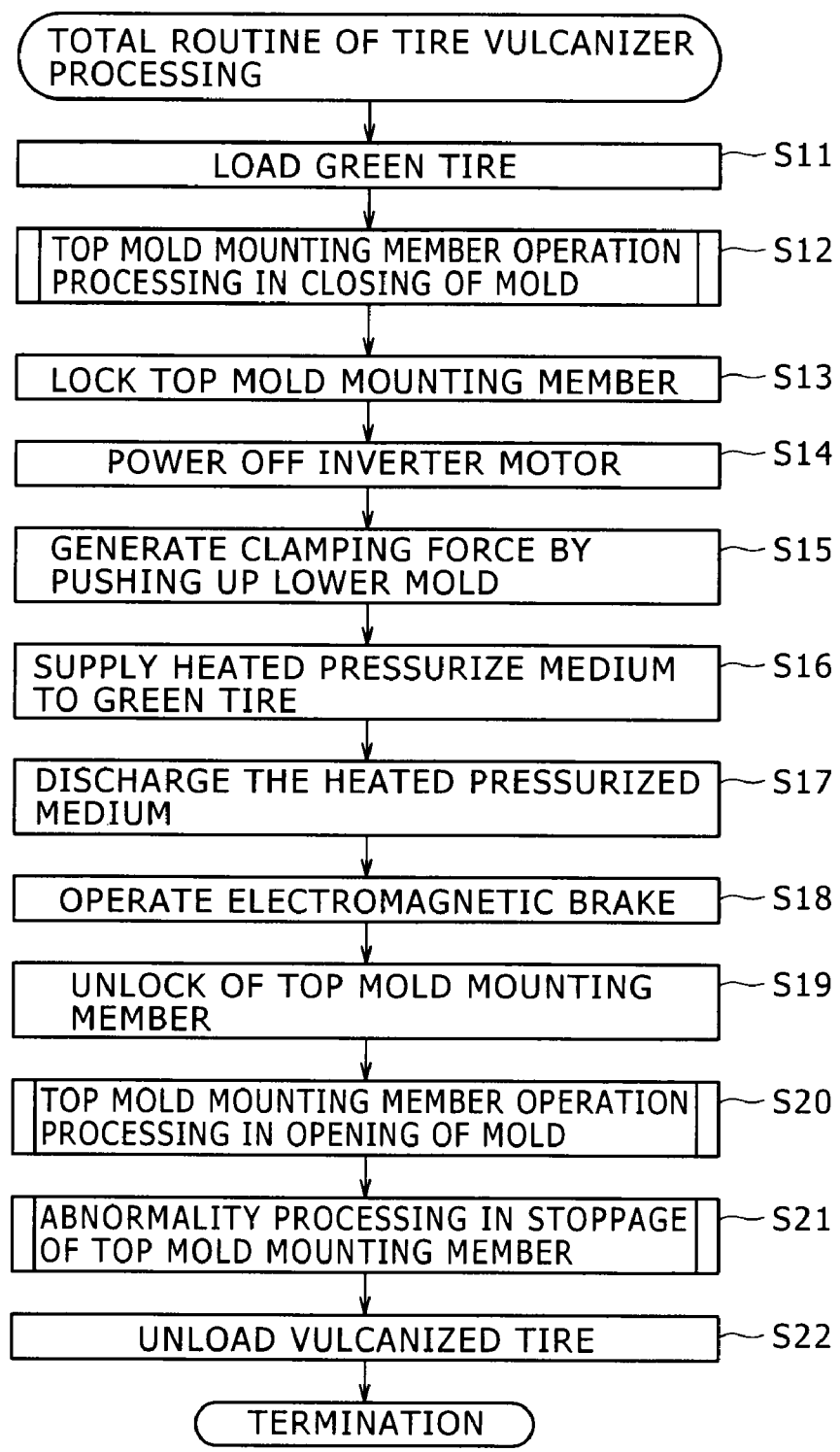
FIG. 5 is a flowchart showing a total routine of tire vulcanizer processing, which is executed by the tire vulcanizer according to the one embodiment of the present invention.

The tire vulcanizer 1 according to this embodiment executes a total routine as shown in FIG. 5. Firstly, in a state where the top mold 11 and the bottom mold 12 are opened as shown in FIG. 2, that is, in a mold opening state where the top mold 11 reaches a predetermined height position (the top mold mounting member 20 is in an elevated state), the green tire T is loaded into the tire vulcanizer 1 with the tire loading and unloading apparatus, and a bladder B is inserted into the inside of the green tire T (S11).

Figure 6:
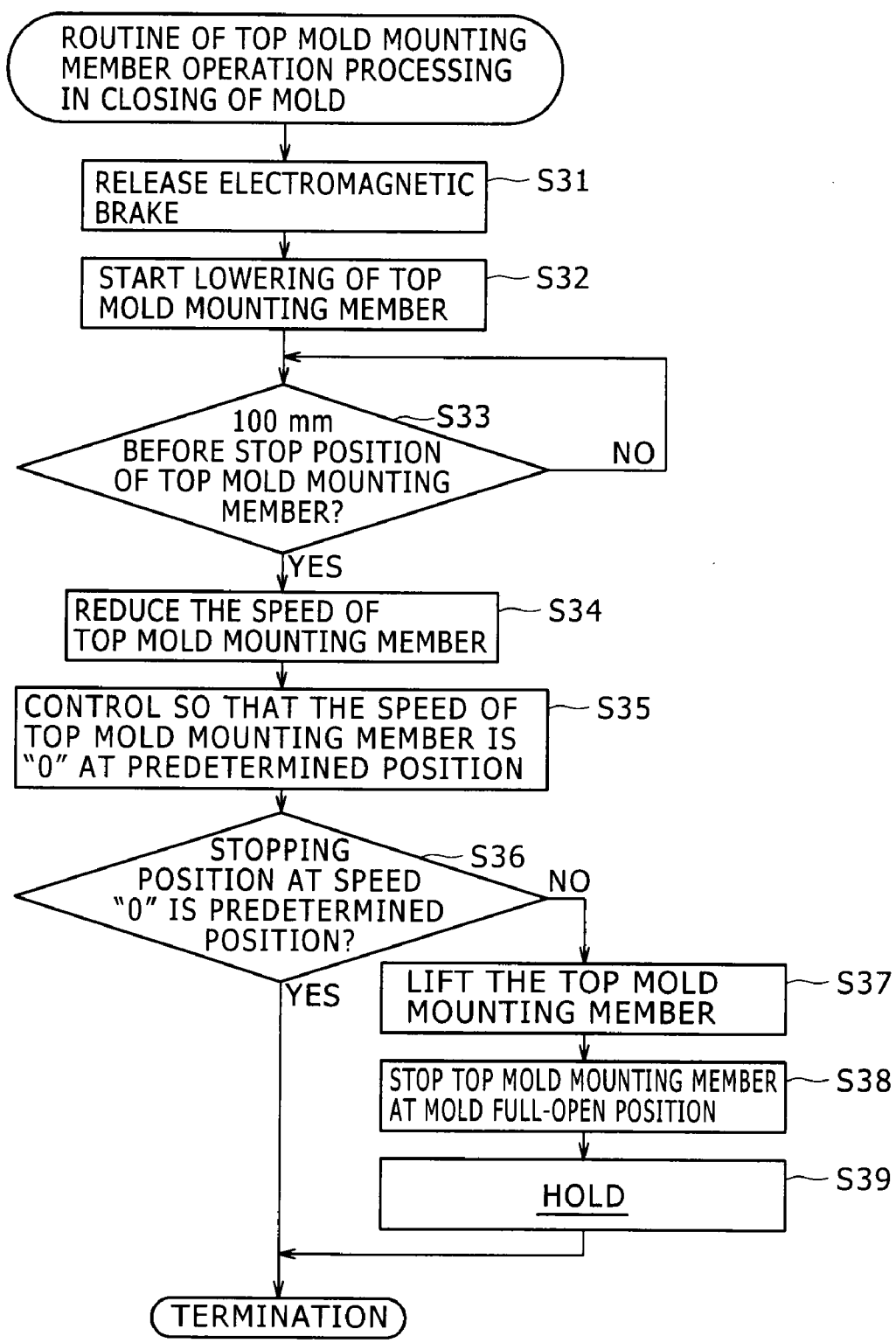
FIG. 6 is a flowchart showing a routine of top mold mounting member operation processing in closing of mold, which is executed by the tire vulcanizer according to the one embodiment of the present invention.

Next, top mold mounting member operation processing in closing of mold is executed by the control device 80, wherein the top mold mounting member 20 is lowered to a predetermined position for vulcanizing the green tire T and then stopped (S12). The detail of the process is shown in FIG. 6.

The top mold mounting member 20 is then locked (S13). In this step, the lower end portion of each tie rod 25 is inserted into the corresponding through-hole 32a, and the lock plate shifting mechanisms 70 locks the top mold 11 to the bottom mold 12. In this way, it is necessary to accurately match the groove 25a of each tie rod 25 to the lock plates of the corresponding lock plate shifting mechanism 70. In this embodiment, the top mold mounting member 20 can be accurately stopped at the predetermined position due to top mold mounting member elevating processing by the control device 80. The inverter motor 52 is powered off by the control device 80 (S14).

Next, a clamping force is generated between the top mold 11 and the bottom mold 12 by lifting the piston member 37a from the initial position by supplying pressure fluid to the gas cylinder 37 to thereby push up the bottom mold 12 (S15). After generation of the clamping force between the top mold 11 and the bottom mold 12, the green tire T is vulcanized by supplying a high-temperature heating and pressurizing medium to the inside of the green tire T through the bladder B (S16). Upon completion of vulcanization, the heating and pressurizing medium held within the vulcanized tire is discharged, and the pressure fluid to the gas cylinder 37 is exhausted (S17). Thereafter, the electromagnetic brake 57 is operated by the control device 80 (S18), and the fixation of the top mold mounting member 20 is unlocked by disengaging the lock plates of each lock plate shifting mechanism 70 from the groove 25a of each tie rod 25 (S19).

Figure 7:
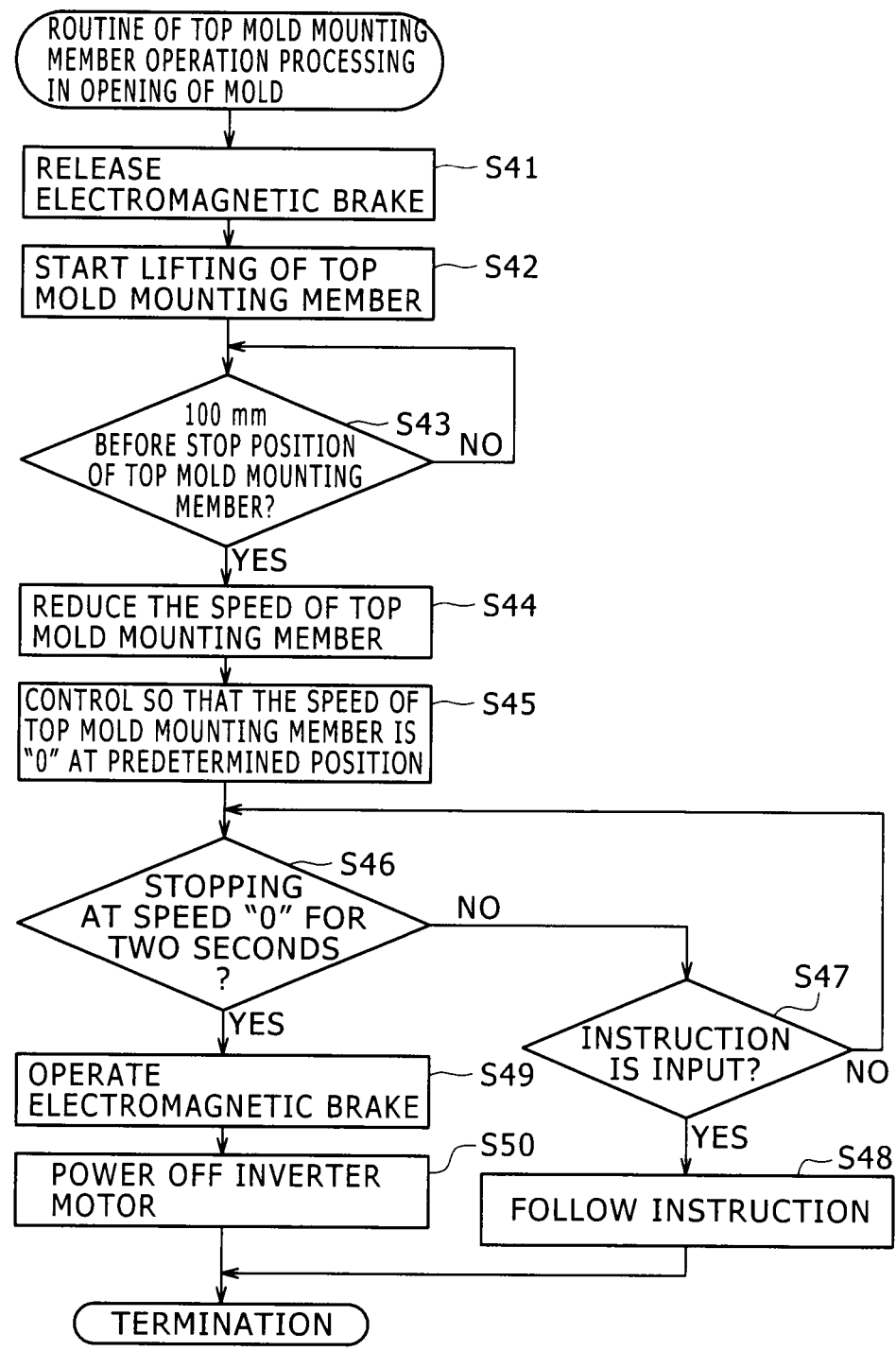
FIG. 7 is a flowchart showing a routine of top mold mounting member operation processing in opening of mold, which is executed by the tire vulcanizer according to the one embodiment of the present invention.
Figure 8:
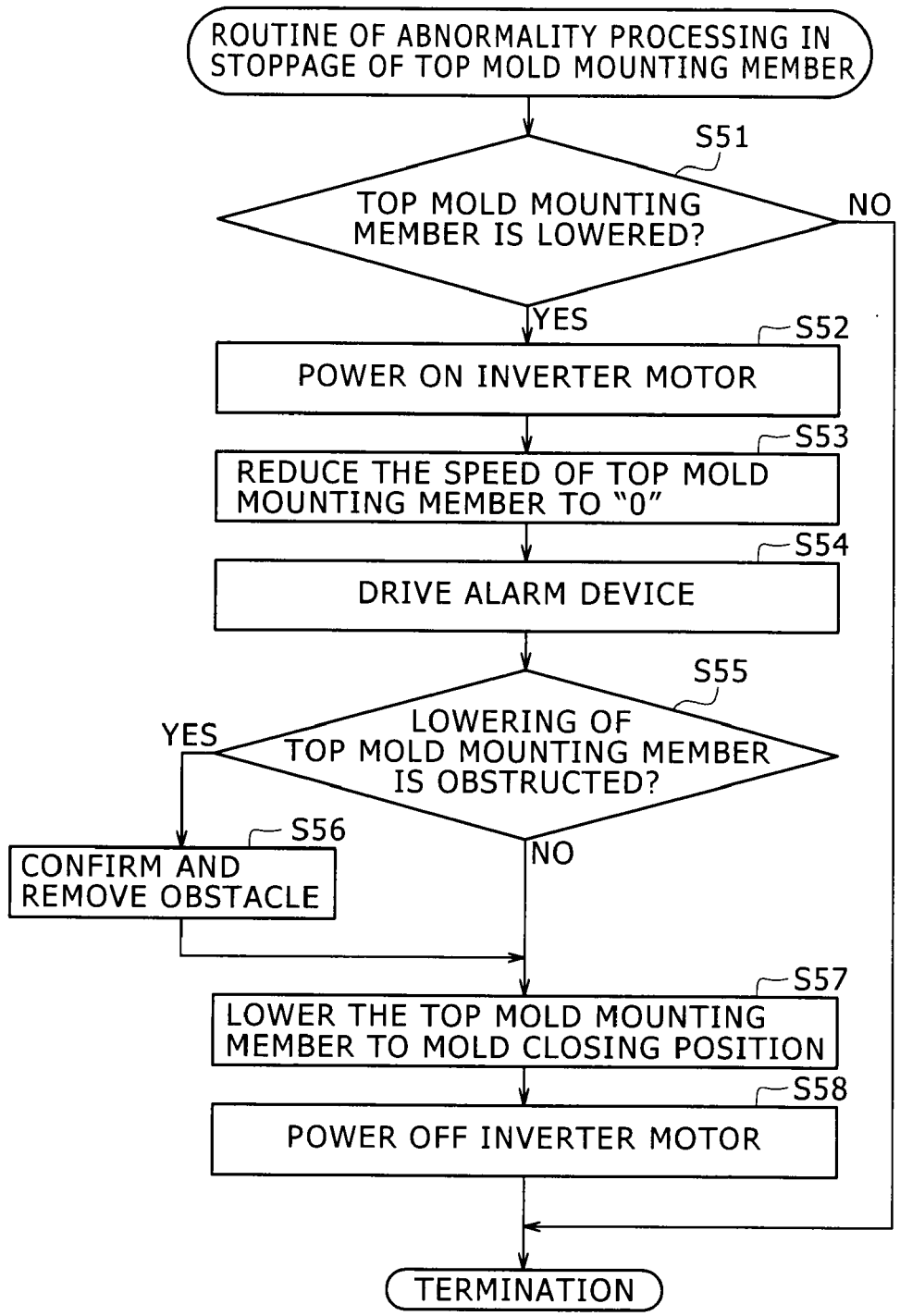
FIG. 8 is a flowchart showing a routine of abnormality processing in stoppage of top mold mounting member, which is executed by the tire vulcanizer according to the one embodiment of the present invention.

Top mold mounting member operation processing in opening of mold is then executed by the control device 80, wherein the top mold mounting member 20 is lifted to a mold opening state and then stopped (S20). Here, the top mold mounting member 20 is lifted until a mold opening position where lower ends of the tie rods 25 are located further above the bladder B. The detail of the process S20 is shown in FIG. 7. Thereafter, abnormality processing in stoppage of top mold mounting member is executed by the control device 80 as a countermeasure for abnormality of the electromagnetic brake 57 (S21). The detail of the process S21 is shown in FIG. 8. After that, the bladder B is pulled out of the vulcanized tire, and the vulcanized tire is unloaded from the tire vulcanizer 1 with the tire loading and unloading apparatus (S22), whereby a series of the total routine of tire vulcanizer processing is completed.

(Routine of Top Mold Mounting Member Operation Processing in Closing of Mold)

A detail of a routine of top mold mounting member operation processing in closing of mold to be executed by the control device 80 is then described.

As shown in FIG. 6, the control device 80 firstly releases the electromagnetic brake 57 (S31), and starts lowering of the top mold mounting member 20 by controlling the inverter 52a to drive the inverter motor 52 (S32). The control device 80 then judges whether the lowering top mold mounting member 20 reaches 100 mm before a predetermined stop position (S33). The distance to the predetermined stop position can be properly set without being limited to 100 mm. If the control device 80 judges that the lowering top mold mounting member 20 does not reach 100 mm before the predetermined stop position, the control device 80 controls to continue the lowering of the top mold mounting member 20 at high speed until it reaches 100 mm. If the control device 80 judges that the lowering top mold mounting member 20 reaches 100 mm before the predetermined position, the control device 80 reduces the speed of the top mold mounting member 20 by controlling the inverter 52a (S34). The control device 80 controls the inverter 52a, when the predetermined position approaches, to further reduce the rotating speed of the inverter motor 52 so that the top mold mounting member 20 has zero speed at the stop position (S35). Namely, the control device 80 servo-locks the inverter motor 52 so that the lowering top mold mounting member 20 performs retained operation at the stop position. During a series of lowering operations of the top mold mounting member 20 which are performed in S32 to S35 described above, abnormality processing in lowering of top mold mounting member shown in FIG. 9 which will be described later is executed as a countermeasure for abnormality of the driving mechanism 59.

Next, the control device 80 judges whether the position where the top mold mounting member 20 is stopped at zero speed is the predetermined stop position (S36). If the control device 80 judges that the position where the top mold mounting member 20 is stopped at zero speed is not the predetermined stop position, the control device 80 lifts the top mold mounting member 20 by controlling the inverter 52a (S37). The control device 80 stops the top mold mounting member 20 at a mold full-open position (S38), and holds it at that position (S39). Thereafter, this routine is terminated. On the other hand, if the control device 80 judges that the position where the top mold mounting member 20 is stopped at zero speed is the predetermined stop position, the control device 80 terminates this routine and proceeds to the next processing.

(Routine of Top Mold Mounting Member Operation Processing in Opening of Mold)

A routine of top mold mounting member operation processing in opening of mold to be executed by the control device 80 is then described. As shown in FIG. 7, the control device 80 operates the electromagnetic brake 57 to fix the ball screw shaft 55a, under the condition that the inverter motor 52 allows the top mold mounting member 20 to perform retained operation to stop in the elevating direction, that is, in a so-called servo-locked state with the inverter 52a, and thereafter powers off the inverter motor 52 by controlling the inverter 52a.

Further, the control device 80 controls the inverter 52a, based on the elevating position of the top mold mounting member 20 measured by the encoder 58, so that the top mold mounting member 20 performs retained operation at the predetermined position, operates the electromagnetic brake 57 to fix the ball screw shaft 55a after the lapse of a predetermined time under the condition that the top mold mounting member 20 performs retained operation at the predetermined position, and thereafter powers off the inverter motor 52 by controlling the inverter 52a.

Concretely, the control device 80 firstly releases the electromagnetic brake 57 (S41), and starts lifting of the top mold mounting member 20 by controlling the inverter 52a to drive the inverter motor 52 (S42). The control device 80 then judges whether the top mold mounting member 20 reaches 100 mm before a predetermined stop position (S43). The distance to the predetermined stop position can be properly set without being limited to 100 mm. If the control device 80 judges that the top mold mounting member 20 does not reach 100 mm before the predetermined stop position, the control device 80 controls to continue the lifting of the top mold mounting member 20 until it reaches 100 mm. If the control device 80 judges that the top mold mounting member 20 reaches 100 mm before the predetermined stop position, the control device 80 reduces the speed of the top mold mounting member 20 by controlling the inverter 52a (S44). The control device 80 controls the inverter 52a, when the predetermined stop position approaches, to further reduce the rotating speed of the inverter motor 52 so that the top mold mounting member 20 has zero speed at the stop position (S45). Namely, the control device 80 servo-locks the inverter motor 52 so that the top mold mounting member 20 performs retained operation at the stop position.

Next, the control device 80 judges whether the top mold mounting member 20 has stopped for two seconds that is a predetermined time since the top mold mounting member 20 stops at the stop position at zero speed (S46). The predetermined time can be properly set without being limited to two seconds, including 0 second. If the control device 80 judges that the top mold mounting member 20 has not stopped for two seconds since it stops at zero speed, the control device 80 judges whether an instruction signal for other operations is inputted from an operator or the like (S47). If no input of other instruction is detected, the control device 80 judges again whether the top mold mounting member 20 has stopped for 2 seconds. If input of other instruction is detected, the control device 80 terminates this routine according to the input instruction signal (S48). On the other hand, if the control device 80 judges that the top mold mounting member 20 has stopped for two seconds since it stops at zero speed in the processing of S46, the control device 80 operates the electromagnetic brake 57 to fix the ball screw shaft 55a so as not to rotate (S49). Thereafter, the control device 80 powers off the inverter motor 52 (S50), whereby this routine is terminated.

According to the above-mentioned operations by the control device 80 and control method, brake is applied with the electromagnetic brake 57 under the condition that the inverter motor 52 allows the top mold mounting member 20 to perform retained operation. Namely, a stopped ball screw shaft 55a is braked with the electromagnetic brake 57. Compared with a case in which the electromagnetic brake 57 is operated simultaneously with power-off of the motor, that is, the inertially-rotated ball screw shaft 55a is suddenly braked with the electromagnetic brake 57, the stopping accuracy of the top mold mounting member 20 can be consequently enhanced, and the life of the friction plate used for the electromagnetic brake 57 or the like can be extended. Namely, if a braking method for operating the electromagnetic brake 57 simultaneously with power-off of the motor is used, the stopping accuracy is varied due to the friction coefficient of the brake, and dislocation from the stop position is apt to occur depending on the degree of damage on the friction plate. In this embodiment, however, such a situation is never caused. Further, since the inverter motor 52 is powered off after the lapse of the predetermined time from the stoppage of the top mold mounting member 20, a load other than own weight, such as the driving force of the inverter motor 52, is not applied to the electromagnetic brake 57. Therefore, the load applied to the electromagnetic brake 57 can be kept constant.

(Routine of Abnormality Processing in Stoppage of Top Mold Mounting Member)

A routine of abnormality processing in stoppage of top mold mounting member to be executed by the control device 80 is then described. As shown in FIG. 8, when the ball screw shaft 55a is fixed with the electromagnetic brake 57, and if the control device 80 judges, based on the elevating position measured by the encoder 58, that the top mold mounting member 20 has lowered, the control device 80 controls the inverter 52a to servo-lock the inverter motor 52, and thereafter if the control device 80 judges absence of obstacle with the obstacle detection device 90, the control device 80 puts the mold 10 into mold closing position by controlling the inverter 52a.

Concretely, the control device 80 judges whether a stopped top mold mounting member 20 has lowered. Namely, the control device 80 judges whether the top mold mounting member 20 stopped by the brake with the electromagnetic brake 57 has lowered due to abnormality because of damage of the electromagnetic brake 57 or the like (S51). If the control device 80 judges that a stopped top mold mounting member 20 has not lowered, the control device 80 terminates this routine. On the other hand, if the control device 80 judges that the stopped top mold mounting member 20 has lowered, the control device 80 powers on the inverter motor 52 (S52).

Next, the control device 80 keeps the speed of the top mold mounting member 20 at 0 by controlling the inverter 52a to servo-lock the powered-on inverter motor 52 (S53). Namely, the control device 80 stops the lowering of the top mold mounting member 20 by use of the inverter motor 52. Thereafter, the alarm device 100 is driven to announce the abnormality to the outside (S54).

The control device 80 then judges, based on obstacle detection information acquired from the obstacle detection device 90, whether an obstacle such as a tire in the tire vulcanizer 1 is present (S55). If the control device 80 judges the presence of an obstacle such as a tire in the tire vulcanizer 1, the control device 80 waits while continuing the monitoring with the obstacle detection device 90, and meanwhile the obstacle is confirmed and removed by an operator (S56). On the other hand, if the control device 80 judges absence of the obstacle such as a tire in the tire vulcanizer 1, the control device 80 controls the inverter 52a to lower the top mold mounting member 20 at low speed until the mold 10 is fully closed (S57). Thereafter, the control device 80 powers off the inverter motor 52 (S58), whereby this routine is terminated.

According to the above-mentioned operations by the control device 80 and control method, even if a stopped top mold mounting member 20 has unexpectedly lowered due to abnormality of the electromagnetic brake 57, the top mold mounting member 20 is brought to an emergency stop with the inverter motor 52. The inverter motor 52 can be thus used as an emergency brake. If absence of obstacle is then confirmed, the mold 10 is automatically put into mold closing position by driving the inverter motor 52. The mold 10 can be consequently safely closed without a trouble such as fall of the top mold mounting member 20 under the presence of obstacle.
(Routine of Abnormality Processing in Lowering of Top Mold Mounting Member)

A routine of abnormality processing in lowering of top mold mounting member to be executed by the control device 80 is then described. As shown in FIG. 9, the control device 80 calculates a lowering speed of the top mold mounting member 20 based on the elevating position of the top mold mounting member 20 measured by the encoder 58, and if the control device 80 judges that the calculated lowering speed is higher than a predetermined limiting speed, the control device 80 operates the electromagnetic brake 57 to fix the ball screw shaft 55a.

Concretely, the control device 80 calculates the lowering speed of the top mold mounting member 20 based on the elevating position of the top mold mounting member 20 measured by the encoder 58, that is, concretely, calculates the lowering speed from an amount of elevating position change per unit time, and judges whether the lowering speed of the top mold mounting member 20 is the predetermined limiting speed or more (S61). If the control device 80 judges that the lowering speed of the top mold mounting member 20 is not the predetermined limited speed or more, the control device 80 waits while continuing the monitoring of lowering speed. On the other hand, if the control device 80 judges that the lowering speed of the top mold mounting member 20 is the predetermined limited speed or more, the control device 80 operates the electromagnetic brake 57 to urgently stop the lowering of the top mold mounting member 20 (S62). Thereafter, the alarm device 100 is driven to announce the abnormality to the outside (S63), whereby this routine is terminated.

According to the above-mentioned operation by the control device 80 and control method, even if the lowering speed of the top mold mounting member 20 exceeds the limiting speed due to abnormality of the inverter motor 52, the top mold mounting member 20 can be brought to an emergency stop with the electromagnetic brake 57. The electromagnetic brake 57 can be thus used as an emergency brake. Since the encoder 58 is provided in a position where the elevating position of the top mold mounting member 20 can be measured not through the driving mechanism 59, it is possible to more surely detect lowering speed of the top mold mounting member 20 that exceeds the limiting speed due to abnormality in the mechanism ranging from the inverter motor 52 to the ball screw shaft 55a constituting the driving mechanism 59. The emergency stop can be performed with the electromagnetic brake 57.

Although the embodiment of the present invention has been described above with reference to the drawings, it is not intended to limit the invention to specific forms of the disclosed embodiment. The scope of the present invention is defined by appended claims rather than by foregoing description of the embodiment, and all changes that fall within the meaning and range of equivalency of the claims are to be embraced within its scope.

What is claimed is:

1. A tire vulcanizer comprising:
    a top mold and a bottom mold for placing a green tire;
    a top mold mounting member connected to said top mold;
    a guide mechanism for vertically guiding said top mold mounting member;
    a ball screw shaft having a vertically aligned shaft center;
    a ball nut screwed to said ball screw shaft and connected to said top mold mounting member;
    a driving mechanism for rotating said ball screw shaft switchably between a normal direction and a reverse direction, wherein said driving mechanism is provided with an inverter motor;
    an inverter capable of servo-locking said inverter motor;
    an excitation-free electromagnetic brake connected directly to said ball screw shaft to fix said ball screw shaft and provided independently from said driving mechanism; and
    a control device configured to execute a brake operation switching control for switching between operation and release of said electromagnetic brake, and a motor power control for powering on and off said inverter motor by controlling said inverter.

2. The tire vulcanizer according to claim 1, wherein
    the tire vulcanizer further comprises:
    a measuring device for measuring an elevating position of said top mold mounting member;
    wherein said control device controls said inverter, based on the elevating position measured by said measuring device, to servo-lock said inverter motor.

3. The tire vulcanizer according to claim 2, wherein
    said control device further is configured to operate said electromagnetic brake to fix said ball screw shaft under the condition that said inverter motor allows said top mold mounting member to perform retained operation to stop in the elevating direction, and thereafter powering off said inverter motor by controlling said inverter.

4. The tire vulcanizer according to claim 2, wherein
    said control device further is adapted to calculate an elevating speed of said top mold mounting member based on the elevating position measured by said measuring device, and if said control device judges that the elevating speed is higher than a predetermined limiting speed, said control device operates said electromagnetic brake to fix said ball screw shaft.

5. The tire vulcanizer according to claim 4, wherein said measuring device is adapted to measure the elevating position of said top mold mounting member not through said driving mechanism.

6. The tire vulcanizer according to claim 2, wherein
when said ball screw shaft is fixed with said electromagnetic brake, and if said control device judges that said top mold mounting member has lowered based on the elevating position measured by said measuring device, said control device controls said inverter to servo-lock said inverter motor.

7. The tire vulcanizer according to claim 2, wherein
the tire vulcanizer further comprises an obstacle detection device for detecting whether an obstacle is within said top mold,
and wherein,
when said ball screw shaft is fixed with said electromagnetic brake, and if said control device judges that said top mold mounting member has lowered based on the elevating position measured by said measuring device, said control device controls said inverter to servo-lock said inverter motor, and thereafter if said control device judges absence of obstacle with said obstacle detection device, said control device puts said mold into mold closing position by controlling said inverter.

8. A brake control method for a tire vulcanizer configured to open and close a mold formed of a top mold and a bottom mold by vertically lifting and lowering a ball nut using rotation of a ball screw shaft with an inverter motor comprising an inverter capable of servo-locking said inverter motor, the ball nut screwed to the ball screw shaft, to thereby lift and lower a top mold mounting member connected to the top mold, the method comprising:
operating an electromagnetic brake independently from operating said inverter motor, under the condition that the inverter motor allows the top mold mounting member to perform retained operation to stop in the elevating direction, to fix the ball screw shaft, and thereafter powering off the inverter motor; and
carrying out a motor power control for powering on and off said inverter motor by controlling said inverter.

9. The brake control method for the tire vulcanizer according to claim 8, wherein,
if an elevating speed of the top mold mounting member is judged to be higher than a predetermined limiting speed, the electromagnetic brake is operated to fix the ball screw shaft.

10. The brake control method for the tire vulcanizer according to claim 8, wherein,
when the ball screw shaft is fixed with the electromagnetic brake, and if the top mold mounting member is judged to have lowered, the inverter motor is servo-locked.

11. The brake control method for the tire vulcanizer according to claim 8, wherein,
when the ball screw shaft is fixed by operating the electromagnetic brake, and if the top mold mounting member is judged to have lowered, the inverter motor is servo-locked, and thereafter if absence of obstacle within the mold is judged, the mold is put into mold closing position.

* * * * *